(12) United States Patent
Tokorozuki et al.

(10) Patent No.: US 10,921,775 B2
(45) Date of Patent: *Feb. 16, 2021

(54) PRODUCTION SYSTEM

(71) Applicant: Renesas Electronics Corporation, Tokyo (JP)

(72) Inventors: Kazuyuki Tokorozuki, Ibaraki (JP); Toshihiro Nakajima, Ibaraki (JP)

(73) Assignee: Renesas Electronics Corporation, Tokyo (JP)

( * ) Notice: Subject to any disclaimer, the term of this patent is extended or adjusted under 35 U.S.C. 154(b) by 73 days.

This patent is subject to a terminal disclaimer.

(21) Appl. No.: 16/291,273

(22) Filed: Mar. 4, 2019

(65) Prior Publication Data

US 2019/0196443 A1  Jun. 27, 2019

Related U.S. Application Data

(62) Division of application No. 15/356,659, filed on Nov. 20, 2016, now Pat. No. 10,261,496.

(30) Foreign Application Priority Data

May 23, 2016  (JP) .................................. 2016-102586

(51) Int. Cl.
*G05B 19/406* (2006.01)
*G05B 19/418* (2006.01)
*G06N 20/00* (2019.01)

(52) U.S. Cl.
CPC ....... *G05B 19/406* (2013.01); *G05B 19/4184* (2013.01); *G05B 2219/33322* (2013.01); *G05B 2219/45031* (2013.01); *G06N 20/00* (2019.01); *Y02P 90/02* (2015.11)

(58) Field of Classification Search
None
See application file for complete search history.

(56) References Cited

U.S. PATENT DOCUMENTS 6,629,009 B1   9/2003 Tamaki
2005/0159835 A1  7/2005 Yamada et al.
(Continued)

FOREIGN PATENT DOCUMENTS

JP   2000-269108 A   9/2000
JP   2005-197323 A   7/2005
(Continued)

OTHER PUBLICATIONS

Office Action dated Apr. 28, 2020, in Japanese Patent Application No. 2016-102586.
(Continued)

*Primary Examiner* — Whitney Moore
(74) *Attorney, Agent, or Firm* — SGPatents PLLC

(57) ABSTRACT

A sensor monitors a treatment status of a predetermined manufacturing device, and an abnormality detection device detects an abnormality of a sensor signal that is a monitoring result of the sensor. The sensor signal is a digital data group obtained by sampling an analog waveform at a predetermined sampling period. A management apparatus learns characteristics of a plurality of digital data groups accumulated in past times through use of artificial intelligence to generate a learned model. An abnormality detection device holds the learned model and determines whether an abnormality is present in the digital data group of a current processing target by using the learned model.

7 Claims, 11 Drawing Sheets

(56) References Cited

U.S. PATENT DOCUMENTS

2017/0220008 A1    8/2017  Takahashi et al.
2018/0321672 A1   11/2018  Cella et al.

FOREIGN PATENT DOCUMENTS

JP    2006-099565 A     4/2006
WO   WO 2005/045907 A1  5/2005

OTHER PUBLICATIONS

Atsushi Takano, Publisher, Nikkei Technology Online, online publication of Production System invented by Kazuyuki Tokorozuki and Toshihiro Nakajima, Nov. 26, 2015, http://techon.nikkeibp.co.jp/atcl/event/15/110400015/112500006/.

Katsunobu Suzuki, Toshi Takakura, Publishers, presentation document of Production System invented by Kazuyuki Tokorozuki and Toshihiro Nakajima, SCF 2015 Exhibition, Tokyo Japan, Dec. 2-7, 2015.

Mayuko Murao, Publisher, EE Times Japan, online publication of Production System invented by Kazuyuki Tokorozuki and Toshihiro Nakajima, Nov. 26, 2015, http://eetimes.jp/ee/articles/1511/26/news072.html.

Nikkei, Inc., online publication of Production System invented by Kazuyuki Tokorozuki and Toshihiro Nakajima, Nov. 25, 2015, http://www.nikkei.com/article/DGXLZO94413380V21C15A1TI1000/.

Renesas Electronics Corporation, news release of Production System invented by Kazuyuki Tokorozuki and Toshihiro Nakajima, Nov. 26, 2015, http://www.renesas.com/ja-jp/about/press-center/news/2015/news20151126.html.

Toshi Takakura, Publisher, presentation document of Production System invented by Kazuyuki Tokorozuki and Toshihiro Nakajima, 19th Embedded Systems Expo (ESEC), Tokyo, Japan, May 11, 2016.

Toshi Takakura, Publisher, publication of Production System invented by Kazuyuki Tokorozuki and Toshihiro Nakajima, Plant Engineer, vol. 48, No. 4, Apr. 2016, pp. 60-65.

Office Action dated Oct. 29, 2019, in Japanese Patent Application No. 2016-102586.

FIG. 6A

| | CLASS | CONTENT |
|---|---|---|
| DEVICE PARAMETER | L1 | DEVICE TYPE ID |
| | L2 | UNIT No |
| | L3 | CHAMBER No |
| | L4 | RECIPE ID |
| | L5 | STEP ID |

LARGE CLASSIFICATION ↑
SMALL CLASSIFICATION

FIG. 6B

| | CLASS | CONTENT |
|---|---|---|
| PRODUCT PARAMETER | L1 | FAMILY ID |
| | L2 | PROCESS RULE ID |
| | L3 | PRODUCT TYPE GROUP ID |
| | L4 | PRODUCT TYPE ID |
| | L5 | PROCESS ID |

LARGE CLASSIFICATION ↑
SMALL CLASSIFICATION

FIG. 7

MST: SETTING INFORMATION

| No. | MONITORING PARAMETER (SENSOR SIGNAL) | SAMPLING PERIOD | REPRESENTATIVE VALUE MONITORING ITEM | | AI MONITORING ITEM | |
|---|---|---|---|---|---|---|
| | | | SUMMARY TIME | REPRESENTATIVE VALUE | AI MODEL | CLASSIFICATION METHOD |
| 1 | RF POWER | 50ms | - | - | ARTIFICIAL INTELLIGENCE ALGORITHM a | PROCESS ID |
| 2 | "g1" GAS FLOW RATE | 50ms | - | - | ARTIFICIAL INTELLIGENCE ALGORITHM a | PRODUCT TYPE ID |
| 3 | "g2" GAS FLOW RATE | 50ms | - | - | ARTIFICIAL INTELLIGENCE ALGORITHM a | PRODUCT TYPE ID |
| 4 | EPD | 50ms | - | - | ARTIFICIAL INTELLIGENCE ALGORITHM b | RECIPE ID |
| 5 | PUMP CURRENT | 100μs | 15s | MAXIMUM VALUE | - | - |
| ... | ... | ... | ... | ... | ... | ... |

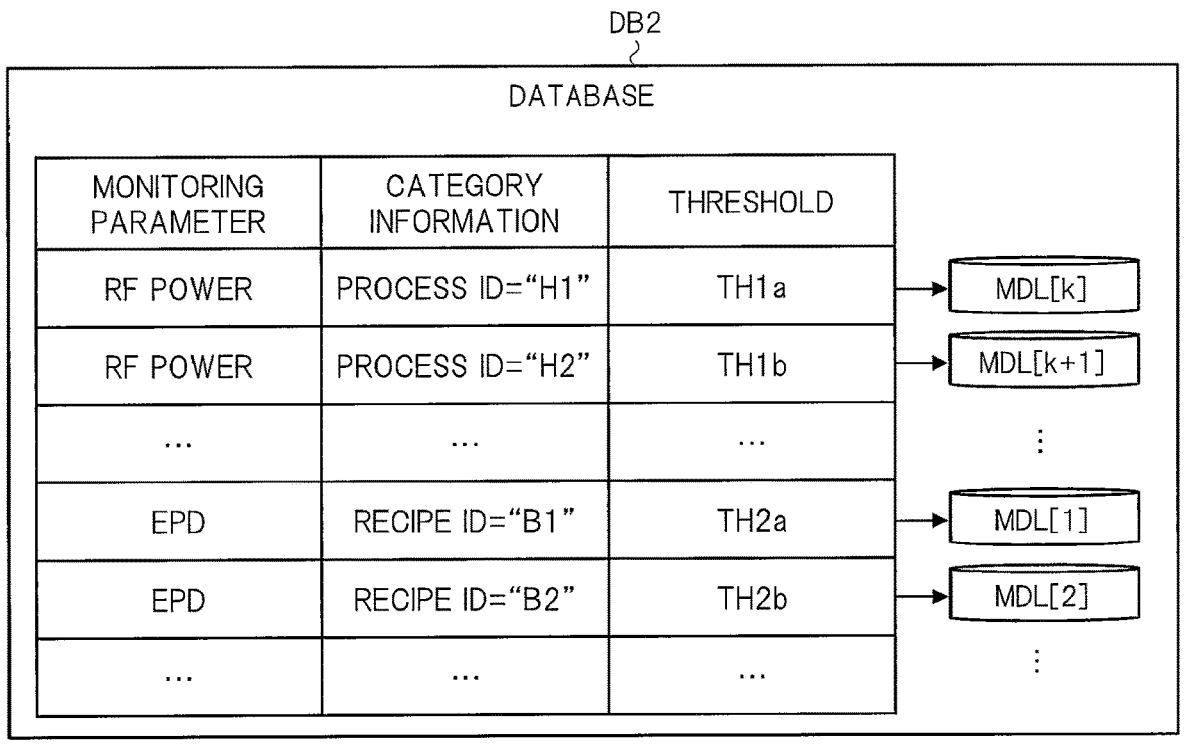

PRODUCTION SYSTEM

CROSS-REFERENCE TO RELATED APPLICATION

The present application claims priority from Japanese Patent Application No. 2016-102586 filed on May 23, 2016, the content of which is hereby incorporated by reference into this application.

TECHNICAL FIELD OF THE INVENTION

The present invention relates to a production system, for example, to a technique for detecting various abnormalities of a production system.

BACKGROUND OF THE INVENTION

For example, International Publication No. WO 2005-045907 (Patent Document 1) discloses a method for detecting off-specification defective wafers in real time by providing an abnormality detection server. To be specific, the abnormality detection server receives device log data from a semiconductor manufacturing device and determines whether an abnormality is present in the data based on a previously held abnormality detection condition setting file.

SUMMARY OF THE INVENTION

In recent years, for facilitating improvement of production quality and improvement of various kinds of production efficiency such as improvement of treatment efficiency, processing efficiency, and work efficiency in a production system for producing various products, a technique called the Internet of Things (IoT) or the Machine to Machine (M2M) has attracted attention. In the production system using such a technique, for example, it becomes possible to cause sensors to monitor treatment status of each manufacturing device in real time and to detect an abnormality or a tendency of the abnormality on the products or the manufacturing devices in early stages based on the monitoring results.

For detecting this abnormality or the like, a method of using an abnormality detection server as described in Patent Document 1, for example, can be considered. In this case, the abnormal detection server collects data successively output from the sensor through a communication network and determines whether an abnormality of the output data group is present based on a file held in advance. However, this method may cause congestion of the communication network, overload of the abnormality detection server, or the like. Accordingly, for improving the production efficiency, sensing in detail at various positions including analog sensing becomes beneficial, while an amount of data output from the sensors becomes huge.

Embodiments to be described later are achieved in view of these matters, and other objects and novel characteristics will be apparent from the description of the present specification and the accompanying drawings.

The production system according to an embodiment is a system for manufacturing a product by using a plurality of manufacturing processes, and the production system includes a plurality of edge devices, a master device, a sensor, an abnormality detection device, and a communication network. The plurality of edge devices perform treatment associated with the plurality of manufacturing processes, and the master device manages the entire production system. The sensor and the abnormality detection device are provided corresponding to a predetermined edge device. The sensor monitors a treatment status of the predetermined edge device, and the abnormality detection device detects an abnormality of a sensor signal that is a monitoring result of the sensor. The communication network connects the plurality of edge devices, the master device, and the abnormality detection device. Here, the sensor signal is a digital data group obtained by sampling an analog waveform at a predetermined sampling period. The master device learns characteristics of a plurality of the digital data groups accumulated in past times through use of artificial intelligence to generate a learned model. The abnormality detection device holds the generated learned model and determines whether an abnormality is present in the digital data group which is a current processing target by using the held learned model.

According to the above-mentioned embodiment, an abnormality of the production system can be detected without congesting the communication network.

BRIEF DESCRIPTIONS OF THE DRAWINGS

FIG. 6A is a supplementary diagram of FIG. 5;

FIG. 6B is a supplementary diagram of FIG. 5;

FIG. 7 is an explanatory diagram illustrating an example of setting information to be used when a management apparatus generates a learned model in the production system in FIG. 1;

FIG. 9 is a schematic diagram illustrating a configuration example of a database (DB of the learned model) in the production system in FIG. 1;

FIG. 10 is an explanatory diagram illustrating an example of setting information of the abnormality detection unit in the abnormality detection device in FIG. 2;

DESCRIPTIONS OF THE PREFERRED EMBODIMENTS

Figure 1:
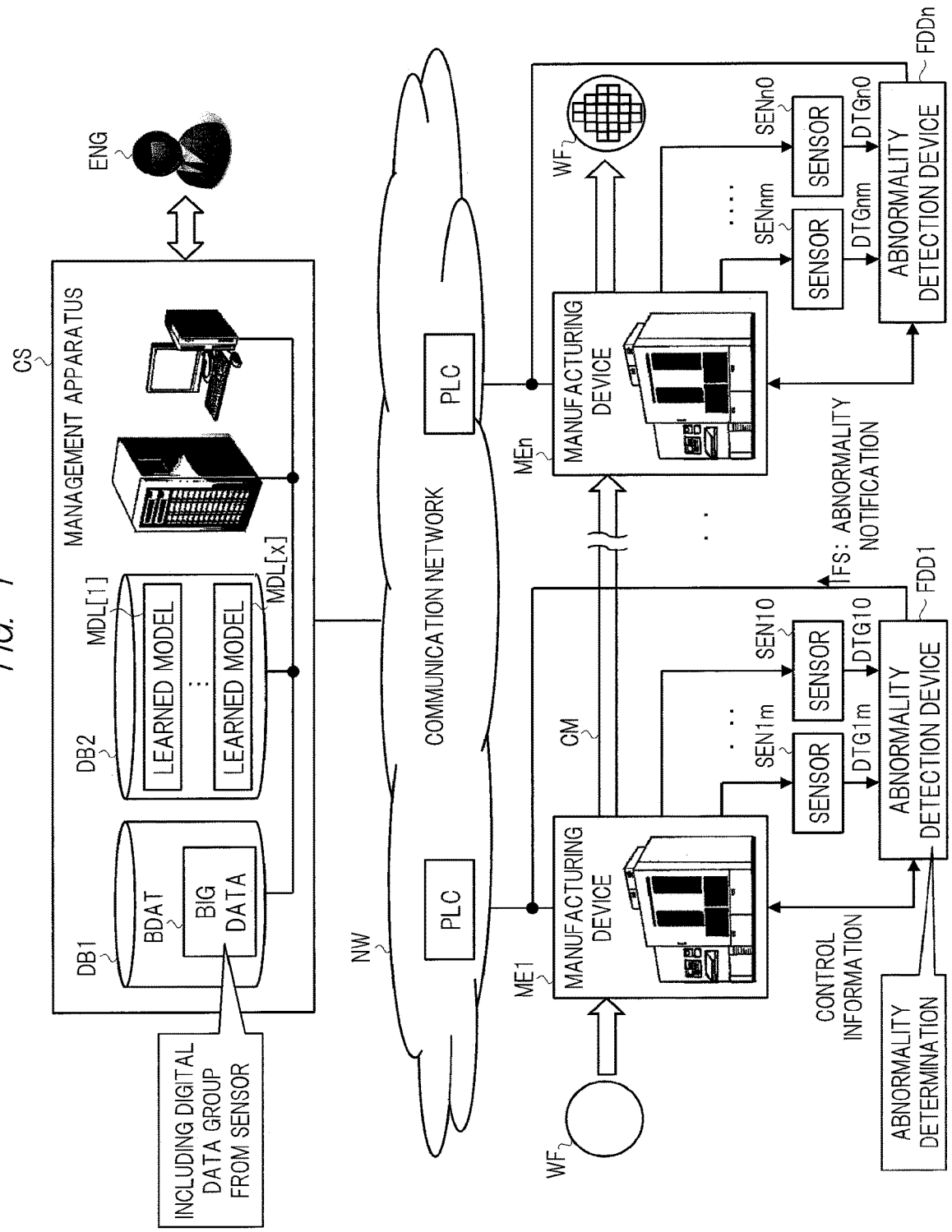
FIG. 1 is a schematic diagram illustrating a configuration example of a main part of a production system according to a first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specific number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof is omitted.

First Embodiment

<<Schematic Configuration of Production System>>

FIG. 1 is a schematic diagram illustrating a configuration example of a main part of a production system according to a first embodiment of the present invention. Here, a production system executing a preceding process of a semiconductor product is assumed as an example of the production system. The production system in FIG. 1 has a plurality of (here, n number of) manufacturing devices (edge devices) ME1 to MEn, a management apparatus (master device) CS, a plurality of sensors SEN10 to SEN1$m$, . . . SENn0 to SENnm, a plurality of abnormality detection devices FDD1 to FDDn, a communication network NW, and a product transfer mechanism CM. In the present specification, each of the plurality of manufacturing devices ME1 to MEn is represented by a manufacturing device ME, and each of the plurality of sensors SEN10 to SEN1$m$, . . . SENn0 to SENnm is represented by a sensor SEN.

The plurality of manufacturing devices (edge devices) ME1 to MEn execute processing treatment associated with a plurality of manufacturing processes by using a predetermined process recipe. To be specific, each of the manufacturing devices ME1 to MEn is, for example, a plasma chemical vapor deposition (plasma CVD) device performing processing treatment associated with a film formation process, an exposure device performing processing treatment associated with a patterning process, or a plasma etching device performing processing treatment associated with an etching process, or the like. Such a manufacturing device ME performs processing treatment of a corresponding manufacturing process based on a detailed processing treatment method and a detailed processing treatment condition stipulated as a process recipe.

The management apparatus (master device) CS is constituted by, for example, an assembly of a plurality of server devices, a terminal device, or a storage device, etc. and manages an entire production system. The management apparatus CS also includes a manufacturing execution system (MES) or the like. The management apparatus CS can exchange various kinds of information with an engineer ENG through a terminal device such as a personal computer (PC). Further, the management apparatus CS is provided with databases DB1 and DB2 mainly constituted by a storage device such as a hard disk.

The sensors SEN10 to SEN1$m$ are provided corresponding to the manufacturing device ME1 in order to monitor the status of the processing treatment of the manufacturing device ME1. The sensors SEN10 to SEN1$m$ are represented by a flow sensor for monitoring a flow rate of gas, a pressure sensor for monitoring a chamber pressure, a power sensor for monitoring an RF power of plasma, and an endpoint detector (EPD) for monitoring the progress of etching and include other various types. Note that the sensors SEN10 to SEN1$m$ may be provided in the manufacturing device ME1.

At least a part of the sensors SEN10 to SEN1$m$ carry out analog sensing. In this example, both of the sensors SEN10 and SEN1$m$ are assumed to carry out analog sensing. In this case, each of the sensors SEN10 and SEN1$m$ outputs a sensor signal that is a monitoring result through a built-in or an external analog-digital converter. In other words, the analog-digital converter outputs the digital data groups DTG10 and DTG1$m$ by sampling analog waveforms from the sensors SEN10 and SEN1$m$ at respective predetermined sampling periods. In the present specification, the digital data groups mean a digital data assembly obtained for each sampling period during a predetermined monitoring period. Further, in the present specification, each of digital data groups (for example, DTG10 and DTG1$m$) is represented by a digital data group DTG.

The abnormality detection device FDD1 is provided corresponding to the manufacturing device ME1 and detects an abnormality of each of the sensor signals (actually, digital data groups DTG10 and DTG1$m$) that are monitoring results of the sensors SEN10 and SEN1$m$. The abnormality detection device FDD1 is provided outside the manufacturing device ME1 in this example and performs communication of control information with the manufacturing device ME1. However, the abnormality detection device FDD1 may be provided inside the manufacturing device ME1, according to a circumstance.

The sensors SENn0 to SENnm are provided corresponding to the manufacturing devices MEn and monitor the status of the processing treatment of the manufacturing devices MEn. The details of the sensors SENn0 to SENnm are similar to those of the sensors SEN10 to SEN1$m$. The abnormality detection device FDDn is provided corresponding to the manufacturing devices MEn. The details of the abnormality detection device FDDn are also similar to those of the abnormality detection device FDD1, and the abnormality detection device FDDn detects an abnormality of each of the sensor signals (actually, digital data groups DTGn0 and DTGnm) that are monitoring results of the sensors SENn0 and SENnm.

The communication network NW connects a plurality of manufacturing devices ME1 to MEn, the management apparatus CS, and the abnormality detection devices FDD1 to FDDn. The communication network NW specifically includes, for example, industrial Ethernet (Ethernet is a registered trademark) known as CC-Link IE, EtherCAT (registered trademark) and EtherNet/IP, etc. Further, a programmable logic controller (PLC) or the like for controlling a sequence or the like of each of the manufacturing devices ME1 to MEn is also provided in the communication network NW. The product transfer mechanism CM transfers products (here, semiconductor wafers WF) to the plurality of manufacturing devices ME1 to MEn successively. A large number of manufacturing devices ME1 to MEn (for example, several hundreds of manufacturing devices) are actually arranged in series or parallel with respect to the traveling direction of the product transfer mechanism CM.

Outline of Configuration and Problems of Production System Comparative Example

Figure 13:
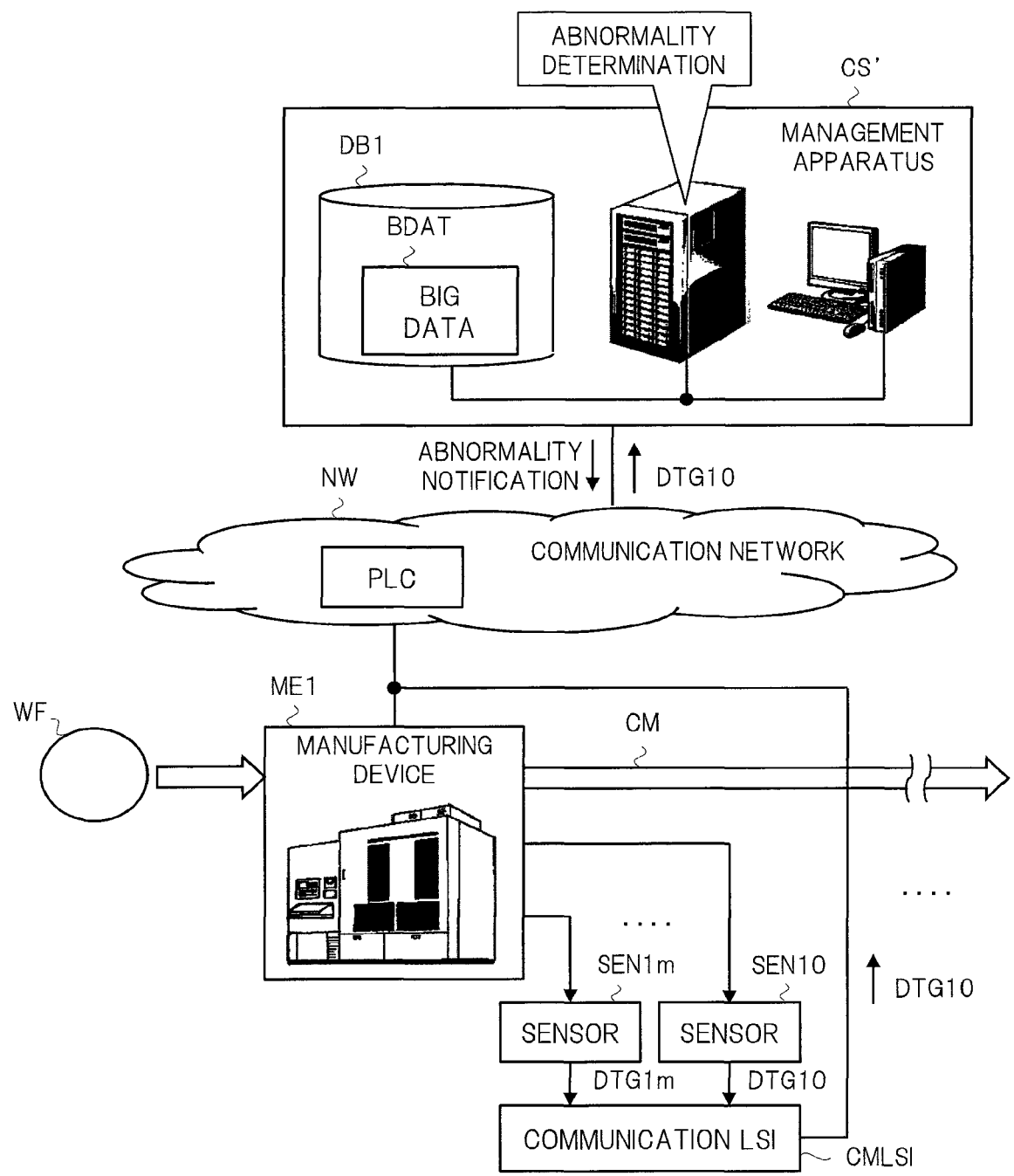
FIG. 13 is a schematic diagram illustrating a configuration example of a main part of a production system on which a study is conducted as a comparative example of the present invention.

FIG. 13 is a schematic diagram illustrating a configuration example of a main part of a production system on which a study is conducted as a comparative example of the present invention. The production system illustrated in FIG. 13 is different from the configuration example of FIG. 1 in that the abnormality detection device FDD1 is replaced with a communication LSI (CMLSI) and a management apparatus CS' is not provided with the database DB2. The communication LSI (CMLSI) receives the digital data groups DTG10 and DTG1m that are monitoring results of the sensors SEN10 and SEN1m, stores the data in a predetermined communication format, and then sends the data to the management apparatus CS' through the communication network NW. The management apparatus CS' receives the digital data groups DTG10 and DTG1m and determines whether an abnormality is present in each data, and then, when an abnormality is present, the management apparatus CS' notifies the corresponding manufacturing device ME1 of the abnormality.

When such a configuration example is used, the following problems may mainly occur. As the first problem, it is difficult to shorten the sampling period of the digital data groups DTG10 and DTG1m. In other words, it is desirable to shorten the sampling period for detecting an abnormality of each of the sensor signals from the sensors SEN10 and SEN1m with higher accuracy (in other words, for reducing detection failures). However, the communication LSI (CMLSI) needs to send each digital data constituting the digital data groups DTG10 and DTG1m faster as the sampling period becomes shorter. As a result, congestion of the communication network NW may be caused. Further, the processing load of the management apparatus CS' determining whether the abnormality is present in the digital data groups DTG10 and DTG1m in real time will also increase. These problems become more remarkable as the number of sensors increases.

As the second problem, even if the sampling period can be shortened, the abnormality may not be necessarily detected with high accuracy from the digital data groups DTG10 and DTG1m. That is, as a method for detecting abnormalities, for example, there is a method for calculating a statistical value such as an average value, a maximum value, a minimum value, and a dispersion value of each digital data constituting the digital data groups DTG10 and DTG1m and then determining whether the statistical value is within the range of a predetermined threshold. However, such a statistical method may cause a situation where presence of an abnormality is determined due to slight noise or the like with a degree not to be normally determined as abnormal (called a false alarm). Alternatively, even when a shape of the analog waveform is actually different to a degree to be determined as abnormal, no abnormality is determined (called misinformation) because the statistical value accidentally falls within the range of the threshold.

<<Details of Abnormality Detection Device>>

Figure 2:
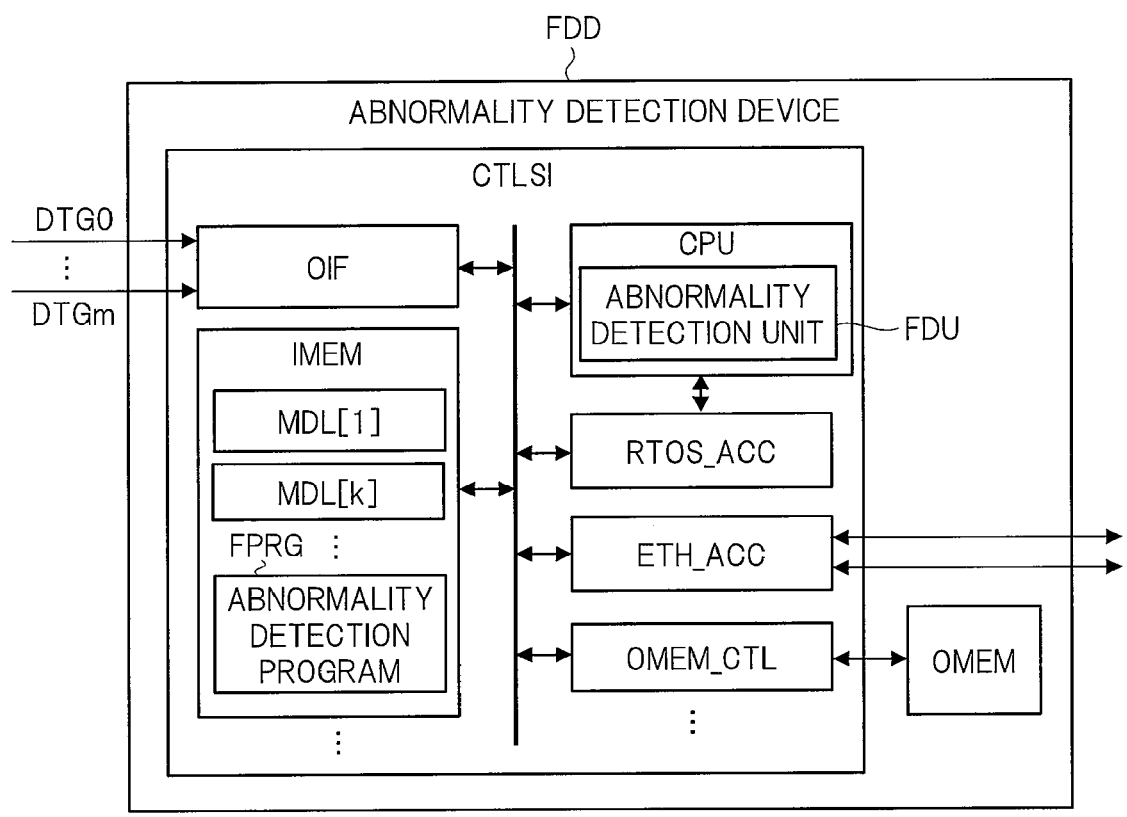
FIG. 2 is a block diagram illustrating a configuration example of an abnormality detection device in the production system in FIG. 1.

Then, the production system in FIG. 1 is provided with the abnormality detection devices FDD1 to FDDn. FIG. 2 is a block diagram illustrating a configuration example of the abnormality detection device in the production system in FIG. 1. The abnormality detection device FDD illustrated in FIG. 2 has, for example, a control LSI (CTLSI) constituted by one semiconductor chip and an external memory device OMEM. The control LSI (CTLSI) includes a processor circuit CPU, an RTOS accelerator circuit RTOS_ACC, an Ethernet accelerator circuit ETH_ACC, an external memory control circuit OMEM_CTL, an external input/output interface circuit OIF, and an internal memory circuit IMEM. These internal circuits are connected with each other with a bus or the like.

The RTOS accelerator circuit RTOS_ACC executes a part of processing of a real time operating system (RTOS) instead of the processor circuit CPU. The Ethernet accelerator circuit ETH_ACC executes various types of communication protocol processing associated with the industrial Ethernet or the like. According to this processing, the control LSI (CTLSI) can execute high speed communication between the communication network NW in FIG. 1 and the corresponding manufacturing device ME. The external memory control circuit OMEM_CTL controls access to the external memory circuit OMEM. The external memory circuit OMEM is not limited particularly and is flash memory or the like.

The external input/output interface circuit OIF performs parallel communication or serial communication with the outside using a predetermined interface specification. As an interface specification, the Controller Area Network (CAN), the Universal Asynchronous Receiver Transmitter (UART), the General Purpose Input Output (GPIO), the I Squared C ($I^2C$), and the like are applicable representatively. The external input/output interface circuit OIF receives digital data groups DTG0 to DTGm from the sensor SEN in FIG. 1 (for example, digital data groups DTG10 to DTG1m from the sensors SEN10 to SEN1m).

The internal memory circuit IMEM is, for example, dynamic RAM (DRAM) or static RAM (SRAM) and holds a plurality of learned models MDL[1], MDL[k], ... and an abnormality detection program FPRG for detecting an abnormality using the learned models. The processor circuit CPU has an abnormality detection unit FDU constituted by executing the abnormality detection program FPRG. In this example, since the RTOS accelerator circuit RTOS_ACC or the like is provided, the processor circuit CPU can execute the abnormality detection program FPRG while keeping a sufficient resource.

Here, the database DB1 in FIG. 1 holds the plurality of digital data groups DTG10 to DTG1m, ... DTGn0 to DTGnm that are past monitoring results of the sensors SEN10 to SEN1m, ..., SENn0 to SENnm as big data BDAT. The management apparatus CS learns the characteristics of the plurality of digital data groups DTG accumulated in past times through use of artificial intelligence (AI) to generate a plurality of learned models MDL[1] to MDL[x] and register these in the database DB2.

For example, the learned model MDL[1] is a model for determining whether the abnormality is present in the digital data group DTG10 from the sensor SEN10, and the learned model MDL[x] is a model for determining whether the abnormality is present in the digital data group DTGnm from the sensor SENnm. In this case, for example, the abnormality detection device FDD1 acquires and holds the learned model MDL[1] registered in the database DB2. The abnormality detection unit FDU of the abnormality detection device FDD1 determines whether the abnormality is present in the digital data group DTG10 that is output from the sensor SEN10 and that is a current processing target by using the learned model MDL[1] which has been held.

Figure 3:
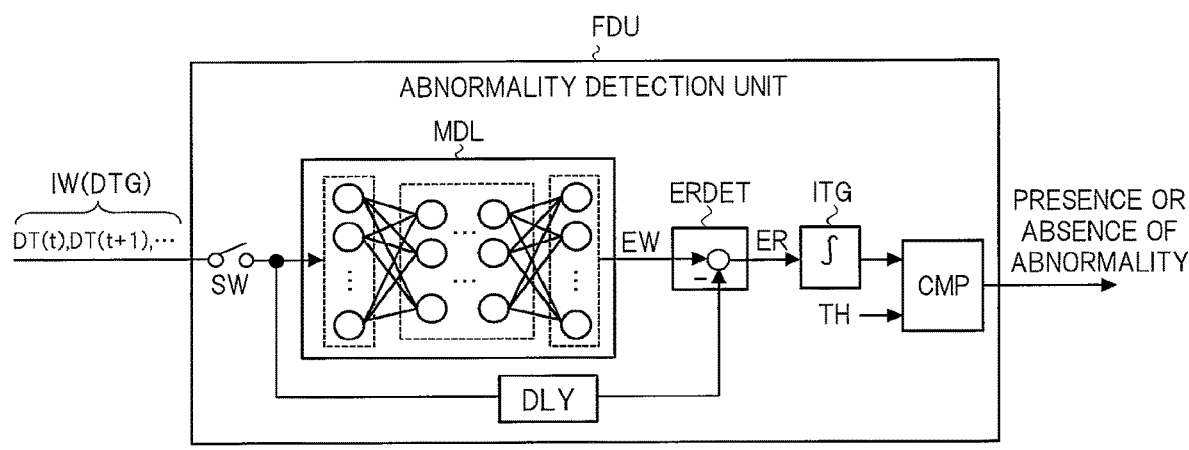
FIG. 3 is a schematic diagram illustrating a configuration example of a main part of an abnormality detection unit in the abnormality detection device in FIG. 2.
Figure 4:
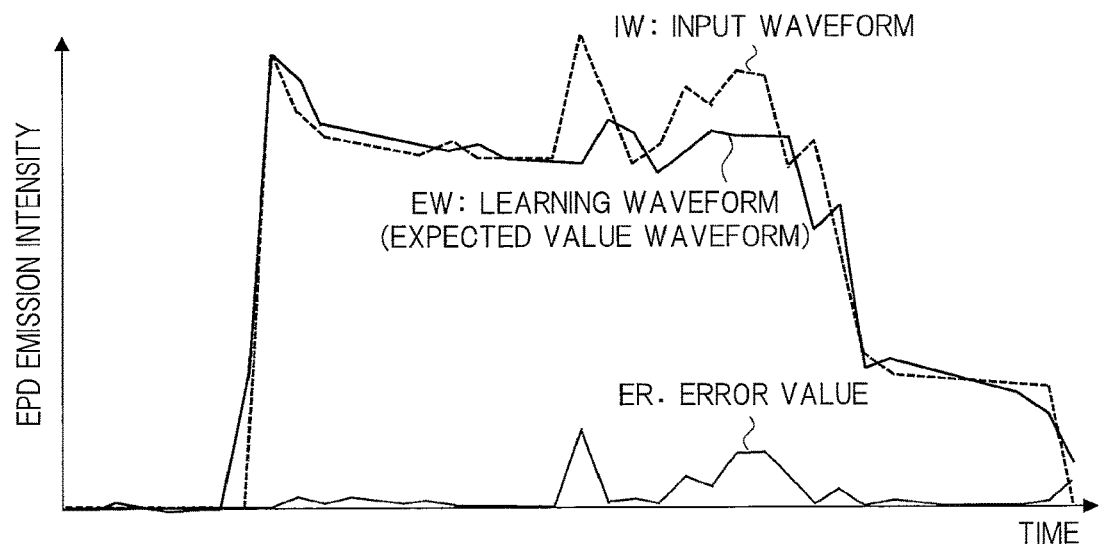
FIG. 4 is an explanatory diagram illustrating an operation example of the abnormality detection unit in FIG. 3.

FIG. 3 is a schematic diagram illustrating a configuration example of a main part of the abnormality detection unit in the abnormality detection device in FIG. 2. FIG. 4 is an explanatory diagram illustrating an operation example in the abnormality detection unit in FIG. 3. The abnormality detection unit FDU in FIG. 3 is constituted equivalently by execution of the abnormality detection FP program RG by the processor circuit CPU as described above. The abnormality detection unit FDU has a switch SW, a learned model MDL, an error detector ERDET, an integrator ITG, a comparator CMP, and a delay device DLY.

Assuming that the manufacturing device ME1 in FIG. 1 is an oxide film etching device and the sensor SEN10 is an end point detector (EPD), FIG. 4 illustrates, for example, an operation example when the abnormality detection unit FDU of the abnormality detection device FDD1 determines whether the abnormality is present in the digital data group DTG10 from the EPD as a target. The EPD monitors the emission intensity of a predetermined wavelength generated during the etching process and outputs sensor signals (voltage signals) in accordance with the emission intensity. The time series progress of the etching can be known by the sensor signals.

The sensor signal has analog waveforms having complicated forms as illustrated by an input waveform IW in FIG. 4. The digital data group DTG10 obtained by sampling the input waveform IW at a predetermined sampling period is input to the abnormality detection device FDD1. The switch SW in FIG. 3 is controlled to turn on while the input waveform IW is input. The digital data group DTG10 indicating the input waveform IW in FIG. 4 is input to the learned model MDL in FIG. 3 (for example, MDL[1]) which outputs a digital data group indicating a learning waveform EW. The learned model MDL (MDL[1]) is generated by performing pattern learning and the like of a large number of the digital data groups DTG included in big data BDAT and obtained from products to be conforming products, through use of a predetermined AI model.

To be specific, the learned model MDL in FIG. 3 sequentially outputs digital data after a predetermined delay time every time the digital data DT (t), DT (t+1), . . . constituting the digital data group DTG of the input waveform IW are input successively. The plurality of pieces of sequentially output digital data (i.e., digital data group) form the learning waveform EW. The learning waveform EW schematically becomes an expected value waveform in which characteristics of the waveform in the case of having no abnormality are reflected on the input waveform.

The error detector ERDET in FIG. 3 outputs an error value ER illustrated in FIG. 4 by sequentially calculating the error between each digital data output from the learned model MDL and each of the digital data DT (t), DT (t+1), . . . through the delay device DLY. To be more specific, the error value ER is calculated not by performing simple difference calculation but by multiplying the error by a weighting factor appropriately in accordance with each area such as an area in which waveforms are stable or an area in which waveforms largely vary. With this method for calculating an error, improvement of detection accuracy or reduction of false alarms can be achieved. The integrator ITG in FIG. 3 integrates the error value ER, and the comparator CMP determines presence of an abnormality when the integrated value exceeds a predetermined threshold TH. The threshold TH is determined in advance corresponding to the learned model MDL (for example, MDL[1])

There is a case in which a shape of the analog waveform becomes important for determining whether an abnormality is present in a sensor signal (analog waveform) from the sensor SEN represented by the EPD. Thus, the sampling period is determined to be, for example, a value equal to or less than 100 ms (here, 50 ms). In this case, although an amount of data of the digital data group DTG increases, not the management apparatus (master device) CS but the abnormal detection devices (edge devices) FDD1 to FDDn determine whether an abnormality is present according to the method of the present first embodiment, differently from the case in FIG. 13.

Accordingly, the abnormality detection devices FDD1 to FDDn do not need to send the digital data group DTG to the management apparatus CS through the communication network NW in real time, and it is sufficient if the abnormality detection devices FDD1 to FDDn send an abnormality notification FS to the management apparatus CS when an abnormality is present, for example, as illustrated in FIG. 1. Further, it is sufficient if the abnormality detection devices FDD1 to FDDn send a necessary amount of digital data group DTG to the management apparatus CS when necessary, for example.

Accordingly, as the first main effect, an abnormality of production system can be detected without congesting the communication network NW. Further, an increase of the processing load associated with real time processing of the management apparatus CS can be suppressed. As the second main effect, whether the abnormality is present can be determined based on the characteristic shape of the analog waveform through use of artificial intelligence (AI). Hence, probability of false alarms or misinformation can be reduced compared with the case of using the statistical method described in FIG. 13.

As a result of obtaining effects described above, an abnormality can be detected with high accuracy while conducting analog sensing in various steps in the production system, and improvement of the production quality and improvement of various kinds of production efficiency such as improvement of treatment efficiency, processing efficiency, and work efficiency can be facilitated. Note that a production system for semiconductor products has been described herein byway of example. However, the production system in FIG. 1 is not limited thereto and can be applied to various production systems performing various products in various processes in the same manner.

<<Details of Management Apparatus>>

As described above, the management apparatus (master device) CS generates the plurality of learned models MDL[1] to MDL[x] by using big data BDAT based on artificial intelligence (AI). Hereinafter, a method for generating the learned model will be described.

Figure 5:
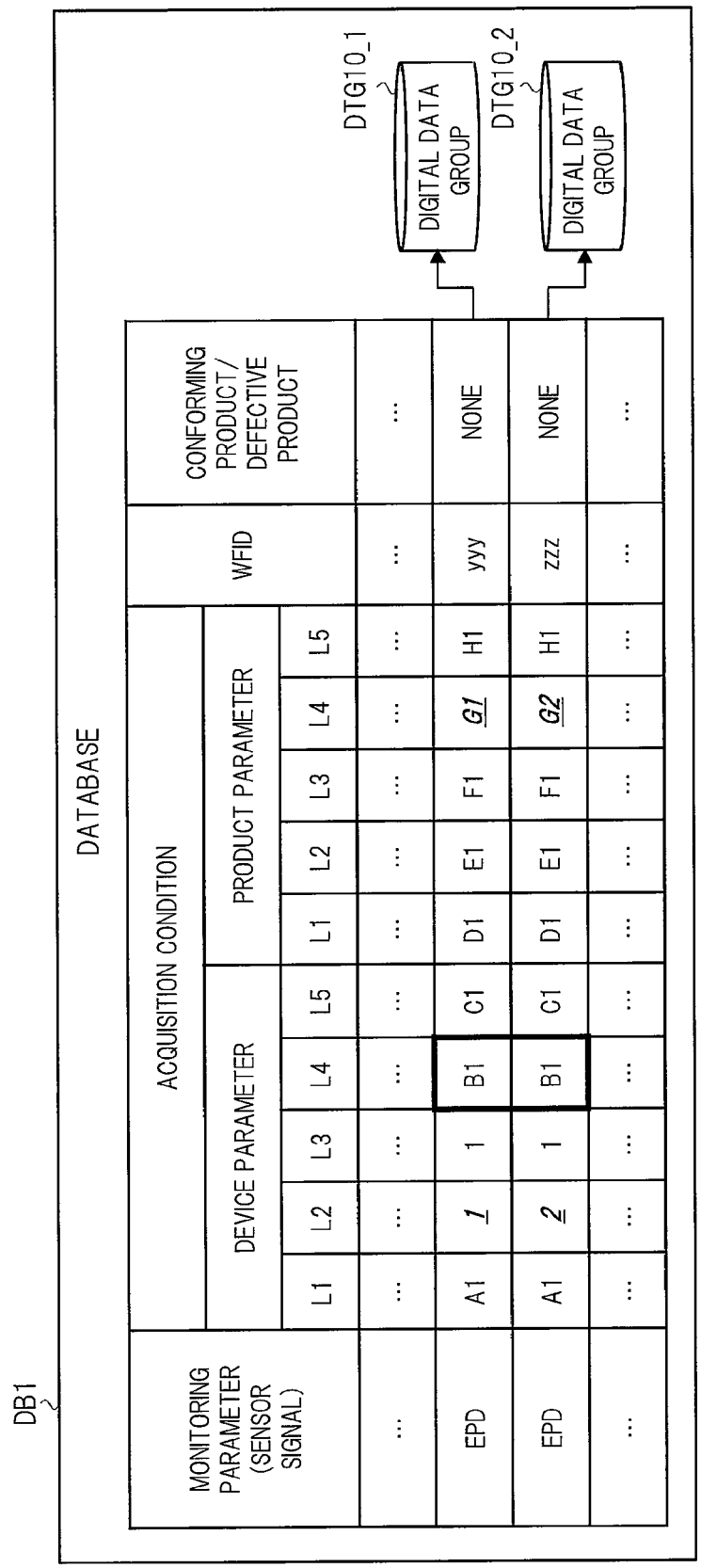
FIG. 5 is a schematic diagram illustrating a configuration example of a database (DB of big data) in the production system in FIG. 1.

FIG. 5 is a schematic diagram illustrating a configuration example of a database (DB of big data) in the production system in FIG. 1. FIGS. 6A and 6B are supplementary diagrams of FIG. 5. The database DB1 in FIG. 5 accumulates a plurality of digital data groups DTG from each of sensors SEN10 to SEN1$m$, . . . , SEN$n$0 to SEN$nm$ to hold. As a part of these, the database DB1 holds a plurality of digital data groups DTG10_1, DTG10_2, . . . from the sensor SEN10 that is an EPD in the example in FIG. 5.

Each of the digital data groups DTG10_1, DTG10_2, . . . is hold while being associated with various kinds of identification information. The various kinds of identification information, for example, include information on a type of monitoring parameter (here, EPD) indicated by the target digital data group DTG, information on an acquisition condition of the digital data group DTG, information on an identifier (abbreviated as ID) WFID of the semiconductor wafer WF that is the source of the digital data group DTG, and information on a conforming product/defective product of the semiconductor wafer WF. The information on the conforming product/defective product is registered later based on, for example, a following wafer inspection, an inspection of finished product, market defects, and the like.

The acquisition condition includes a device parameter and a product parameter. The device parameter is classified into a plurality of (here, five) classes L1 to L5 as illustrated in FIG. 6A. The classes L1, L2, and L3 are a device type ID, a unit No., and a chamber No. respectively, and are device identifiers for narrowing down types of the manufacturing devices ME in a stepwise manner. For example, the device type of manufacturing device ME is identified by the device type ID, and one unit is identified by the unit No. from the plural number of manufacturing devices ME that are of this identified device type, and then, one chamber is identified by the chamber No. from a plurality of chambers included in the identified one manufacturing device ME.

The class L4 is a recipe ID identifying a process recipe, and the class L5 is a step ID identifying a step. The recipe ID indicates detailed treatment contents and treatment conditions of processing treatment associated with one manufacturing process. As a specific example, the recipe ID represents information such as conducting "t1" hour-pretreatment using a gas "g1," conducting "t2" hour-main-treatment using a gas "g2," and conducting "t3" hour-post-treatment using a gas "g3." The step ID identifies each treatment (step) such as pretreatment, main treatment, and post treatment.

Also, the product parameter is also classified into a plurality of (here, five) classes L1 to L5 as illustrated in FIG. 6B. The classes L1, L2, L3, and L4 are a family ID, a process rule ID, a product type group ID, and a product type ID, respectively, and are product identifiers for narrowing down types of semiconductor products in a stepwise manner. When a microcomputer product is taken as an example, the family ID identifies each family such as a family "m1" and a family "m2" classified by difference of basic architecture or the like.

The process rule ID represents process rules such as minimum line widths. The product type group ID identifies each group such as a group "mm1" and group "mm2" in the family "m1." The product type group is distinguished, for example, by a large difference of specifications such as a difference in operation frequency or a difference of equipped functions. The product type ID identifies each product type such as the product type "mmm1" or the product type "mmm2" in the group "mm1." The product type is distinguished, for example, by a small difference of specifications such as a difference in equipped memory capacity or a difference of the number of equipped functions. The class L5 is the process ID and identifies each manufacturing process such as an oxide film etching process and a metal film deposition process, for example.

Each of a device parameter in FIG. 6A and a product parameter in FIG. 6B usually becomes a larger classification having a broader targeted range as the class becomes higher (closer to L1), although there may be some exceptions. In the example in FIG. 5, the digital data groups DTG10_1, DTG10_2, . . . are distinguished from each other by using these classes L1 to L5. For example, the digital data group DTG10_1 is a result of monitoring the status of the processing treatment in which a product of a certain product type (class L4) is processed as a target by an EPD, through use of a certain manufacturing device (for example, ME1). In contrast, the digital data group DTG10_2 is a result of monitoring the status of the processing treatment in which a product different in the product type (class L4) is processed as a target by an EPD, through use of a manufacturing device ME of the same device type and a different unit (class L2).

Here, when a certain learned model MDL is generated through use of artificial intelligence (AI), how to determine the digital data group DTG to be used for generating the learned model MDL becomes important. For example, the case where the digital data groups DTG are classified into the categories on the large classification side in FIG. 6A and FIG. 6B and the learned model MDL is generated for each category is assumed. In this case, one learned model MDL is conceptually generated regardless of a product and a device as the learned model MDL of a certain monitoring parameter. In such a manner, when the target range of the digital data groups DTG to be used for learning is broad, relative variation among a plurality of digital data groups (analog waveforms) to be used for learning becomes too large, and thus, there is fear that the learned model MDL obtained as the learning result may also permit excessive variation. As a result, the possibility of increasing misinformation will be enhanced.

Conversely, the case where the digital data groups DTG are classified into categories on the small classification side in FIG. 6A and FIG. 6B and the learned model MDL is generated for each category is assumed. In this case, a plurality of learned models MDL are conceptually generated every time the combination of a product and a device differs as the learned model MDL of a certain monitoring parameter. In such a manner, when the target range is narrow, there is fear that the number of the learned models MDL becomes huge or parameters of digital data groups to be used in generating each learned model MDL become insufficient. Further, since relative variation among a plurality of digital data groups (analog waveforms) can be too small, there is fear that the learned model MDL obtained as the learning result can also hardly permit the variation. Thus, the possibility of increasing false alarms is enhanced.

Accordingly, it becomes beneficial to determine appropriate classes for achieving reduction of misinformation, false alarms, or the like for each type of monitoring parameter and to classify a plurality of digital data groups DTG corresponding to one monitoring parameter into a plurality of categories based on the determined classes. The management apparatus CS learns through use of artificial intelligence (AI) for each category to generate a learned model MDL for each category. In other words, the management apparatus CS classifies a plurality of digital data groups DTG for a certain monitoring parameter into a plurality of categories and learns based on a predetermined classification method (here, classes) to generate a plurality of learned models MDL corresponding to a plurality of categories, respectively, for the monitoring parameter.

<<Method for Generating Learned Model of Management Apparatus>>

Figure 8:
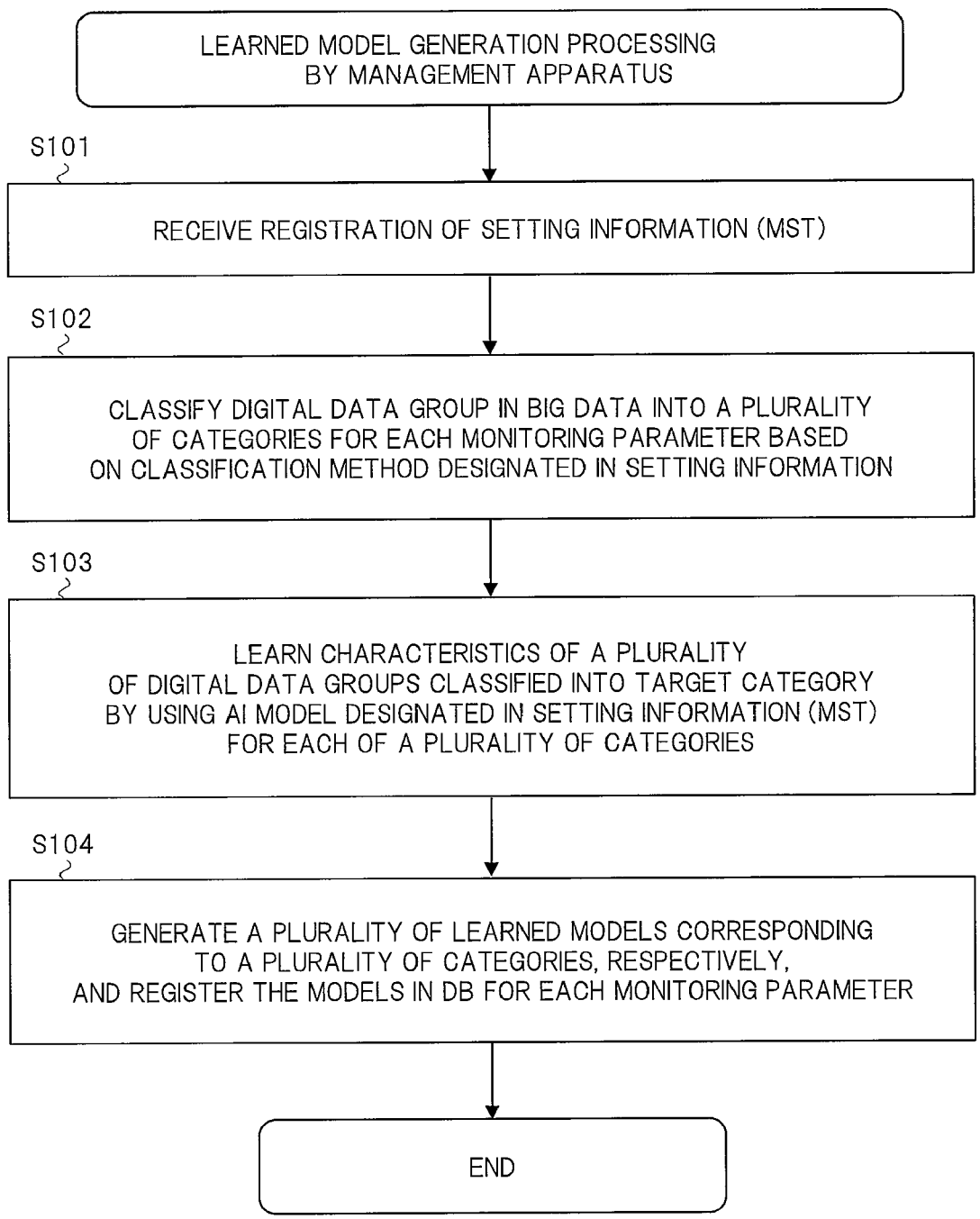
FIG. 8 is a flowchart illustrating an example of processing contents when a management apparatus generates the learned model in the production system in FIG. 1.

FIG. 7 is an explanatory diagram illustrating an example of setting information to be used when the management apparatus generates a learned model in the production system in FIG. 1. FIG. 8 is a flowchart illustrating an example of processing contents when the management apparatus generates the learned model in the production system in FIG. 1. In FIG. 8, the management apparatus (master device) CS first receives registration of setting information MST as in FIG. 7 (step S101). Next, the management apparatus CS classifies a plurality of digital data groups DTG in the big data BDAT into a plurality of categories for each monitoring parameter based on a data classification method designated by the setting information MST (step S102).

Next, the management apparatus CS learns characteristics of the plurality of digital data groups DTG classified into the target category by using an AI model designated in the setting information MST for each of the plurality of classified categories (step S103). Accordingly, the management apparatus CS generates a plurality of learned models MDL each corresponding to a plurality of categories for each monitoring parameter and registers these in the database DB2 (step S104). The details of FIG. 8 will be described below.

The setting information MST illustrated in FIG. 7 is, for example, indicated by an engineer ENG in FIG. 1. By way of example, for the monitoring parameter "RF power," the engineer ENG sets the sampling period to 50 ms, sets the AI model to be used for generating a learned model to the artificial intelligence algorithm a, and sets the classification method of digital data groups to be used for generating a learned model to the process ID (class L5 in FIG. 6B) in FIG. 7 (step S101).

In this case, the management apparatus CS extracts a digital data group of the monitoring parameter "RF power" from the big data BDAT and classifies the extracted digital data groups into a plurality of categories every time the process ID of the product parameter differs regardless of the content of the device parameter (step S102). Then, the management apparatus CS learns the characteristics of the plurality of digital data groups by using the plurality of classified digital data groups and the artificial intelligence algorithm a as the AI model, for each category (for example, the management apparatus CS determines each weighting factor of a neutral network) (step S103). Accordingly, the management apparatus CS generates a plurality of learned models for each process ID as learned models MDL of the monitoring parameter "RF power" (step S104).

As another example, in FIG. 7, the engineer ENG, for the monitoring parameter "EPD," sets the sampling period to 50 ms, sets the AI model to the artificial intelligence algorithm b, and sets the classification method of the digital data groups to the recipe ID (class L4 in FIG. 6A) (step S101). In this case, the management apparatus CS extracts the digital data groups of the monitoring parameter "EPD" from the big data BDAT and classifies those digital data groups into a plurality of categories every time the recipe ID differs regardless of the content of the product parameter (step S102).

Then, the management apparatus CS learns the characteristics of the plurality of digital data groups for each of the category by using the plurality of classified digital data groups and the artificial intelligence algorithm b as the AI model (step S103). Accordingly, the management apparatus CS generates a plurality of learned models for each recipe ID as learned models MDL of the monitoring parameter "EPD" (step S104). When the database DB1 in FIG. 5 is taken as an example, since the digital data groups DTG10_1 and DTG10_2 have the same recipe IDs (class L4 of the device parameter), the digital data groups DTG10_1 and DTG10_2 are used for generating the same learned models MDL. Conversely, if the digital data groups DTG10_1 and DTG10_2 have different recipe IDs, the digital data groups DTG10_1 and DTG10_2 are used for generating different learned models MDL.

Note that, in the example in FIG. 7, as a classification method of the category, although one class in one parameter of the device parameter and the product parameter is used, it is also possible to use one class of the device parameter and one class of the product parameter in combination. For example, when the class L4 (recipe ID) of the device parameter and the class L1 (family ID) of the product parameter are used in combination, certain two digital data groups are used for generating the same learned models when agreement occurs in both of the recipe ID and family ID. Conversely, the two digital data groups are used for generating different learned models when agreement does not occur in one of the recipe ID and family ID.

Further, in the example in FIG. 7, it is possible for the engineer ENG to make the apparatus perform the abnormality determination by using a statistical method as described in FIG. 13 without using artificial intelligence (AI) depending on the monitoring parameter. The engineer ENG, for example, for the monitoring parameter "pump current," sets sampling period to 100 µs, the summary time to 15 s and the representative value to the maximum value. In this case, the management apparatus CS accumulates digital data obtained every 100 µs for 15 s and determines whether an abnormality is present based on the maximum value of the digital data.

For determining appropriately the setting information MST in the case of using the artificial intelligence (AI) in FIG. 7, the engineer ENG searches for the most suitable setting information MST by a simulation or the like and also determines the threshold TH (see FIG. 3) for each learned model MDL in the simulation or the like, though the method is not necessarily limited thereto. To be specific, the engineer ENG makes the management apparatus CS generate a plurality of learned models MDL while appropriately changing, for example, the AI model or the classification method (that is, classes L1 to L5). Then, the engineer ENG builds the abnormality detection unit FDU in FIG. 3 in a simulation and verifies the accuracy of the abnormality determination in the case of inputting a digital data group DTG of a conforming product/defective product previously confirmed, while appropriately changing the learned model MDL of the abnormality detection unit FDU or the threshold TH. Thus, the engineer ENG determines a combination of an AI model, a classification method, and a threshold TH, which enables abnormality determination with high accuracy.

FIG. 9 is a schematic diagram illustrating a configuration example of the database (DB of the learned model) in the production system in FIG. 1. The database DB2 illustrated in FIG. 9 holds the plurality of learned models MDL[1], MDL[2], . . . , MDL[k], MDL[k+1], . . . while associating these models with various kinds of identification information. The various kinds of identification information include a type of the monitoring parameter, category information, and a threshold. For example, the learned model MDL[1] is a model obtained by classifying the monitoring parameter "EPD" by the recipe ID "B1" and is made to correspond to a threshold TH2a. The learned model MDL[2] is a model obtained by classifying the monitoring parameter "EPD" by the recipe ID "B2" and is made to correspond to a threshold TH2b.

Further, the learned model MDL[k] is a model obtained by classifying the monitoring parameter "RF power" by the process ID "H1" and is made to correspond to a threshold TH1a. The learned model MDL[k+1] is obtained by classifying the monitoring parameter "RF power" by the process ID "H2" and is made to correspond to a threshold TH1b. The thresholds TH1a, TH1b, TH2a, and TH2b are determined by the simulation described above or the like.

<<Details of Abnormality Detection Unit>>

FIG. 10 is an explanatory diagram illustrating an example of setting information in the abnormality detection unit in the abnormality detection device in FIG. 2. The abnormality detection unit FDU holds setting information FST illustrated in FIG. 10 in advance. The setting information FST includes a device parameter of a monitoring target, a monitoring parameter, and a classification method and a sampling period for each monitoring parameter. The device parameter includes information on classes L1 to L3 illustrated in FIG. 6A and is fixed information. For example, in FIG. 1, the device parameter held by the abnormality detection unit FDU of the abnormality detection device FDD1 is a device parameter identifying the manufacturing device ME1 and is set to be fixed in advance.

Further, the monitoring parameter is set to be fixed in advance in accordance with the type of the sensor SEN. For example, in FIG. 1, the monitoring parameters held by the abnormality detection unit FDU of the abnormality detection device FDD1 are parameters monitored by the sensors SEN10 to SEN1m. Although its illustration is omitted, the abnormality detection unit FDU holds a correspondence relationship between each monitoring parameter and the sensors SEN10 to SEN1m. For example, the engineer ENG in FIG. 1 registers the device parameter and the monitoring parameter in the abnormality detection devices FDD1 to FDDn through the management apparatus CS in advance.

The classification method and the sampling period in FIG. 10 are determined by reflecting the setting information MST in FIG. 7. That is, the management apparatus CS in FIG. 1 determines a sampling period and a classification method (here, class) for each monitoring parameter based on an instruction of the engineer ENG illustrated in FIG. 7 and registers the determined sampling period and classification method in the abnormality detection devices FDD1 to FDDn. The sampling period, for example, is used in order that the control LSI (CTCLI) in FIG. 2 may set its own processing speed (for example, receiving rate of the digital data groups DTG0 to DTGm).

Figure 11:
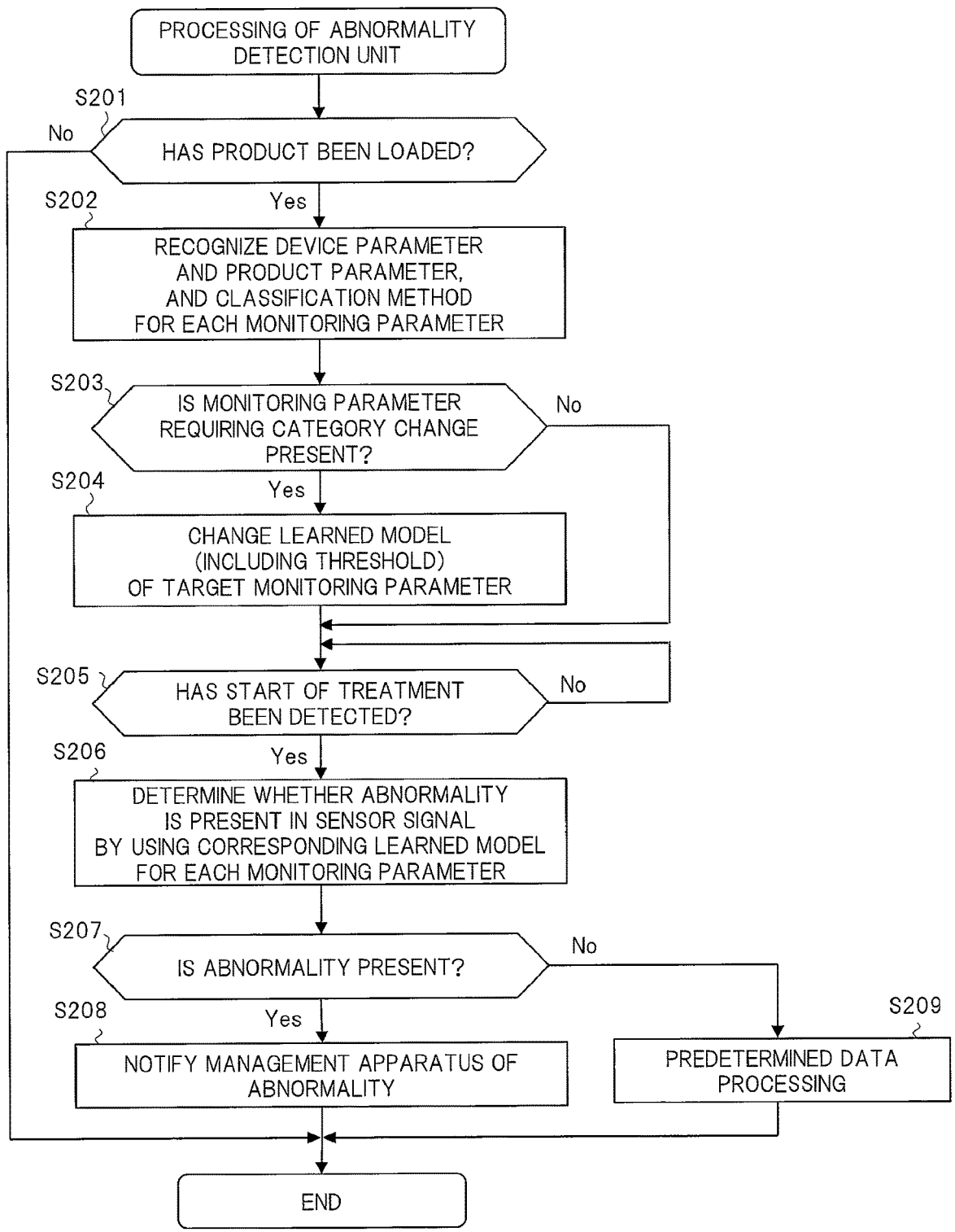
FIG. 11 is a flowchart illustrating an example of processing contents of the abnormality detection unit in the abnormality detection device in FIG. 2.

FIG. 11 is a flowchart illustrating an example of processing contents in the abnormality detection unit in the abnormality detection device in FIG. 2. In FIG. 11, the abnormality detection unit FDU first determines whether a product has been loaded in the manufacturing device ME of the monitoring target through the product transfer mechanism CM in FIG. 1 (step S201). When a product has been loaded, the abnormality detection unit FDU recognizes the device parameter, the product parameter, and the classification method for each monitoring parameter (step S202).

Regarding step S202, the device type ID, the unit No., and the chamber No. included in the device parameter are fixed information determined depending on the manufacturing device ME of the monitoring target. Meanwhile, the recipe ID, the step ID included in the device parameter, and each ID included in the product parameter are variable information. The variable information can be acquired in various methods. For example, a method for acquiring it from the management apparatus CS through the communication network NW, a method for acquiring it from the manufacturing device ME of the monitoring target, and the like are applicable.

As the former method, for example, a method for snooping a loading/process-starting instruction of a product (including above-mentioned variable information) to be issued from the management apparatus CS to the manufacturing device ME, a method for making an inquiry about the information to the management apparatus CS appropriately, and the like are applicable. As the latter method, for example, a method for making an inquiry about the information to the manufacturing device ME, assuming that the manufacturing device ME acquires the above-mentioned variable information from the management apparatus CS or the manufacturing device ME acquires the information from the product through a bar-code or an IC tag, is applicable.

The abnormality detection unit FDU recognizes the category of the digital data group DTG of the current processing target based on the device parameter and the product parameter recognized in this manner and a classification method for each monitoring parameter registered in the setting information FST in FIG. 10. Then, the abnormality detection unit FDU determines whether the monitoring parameter requiring a category change is present based on the recognition result (step S203).

For example, when the monitoring parameter is an EPD, the classification method is the recipe ID. Assuming that the sensor SEN10 in FIG. 1 is an EPD, the abnormality detection unit FDU of the abnormality detection device FDD1 determines that the category change of the EPD is not necessary when the recipe IDs relating to the digital data group DTG10 of the processing target are the same between at the previous process-start and at the current process-start. In contrast, the abnormality detection unit FDU determines that the category change of the EPD is necessary when the recipe IDs relating to the digital data group DTG10 of the processing target are different between at the previous process-start and at the current process-start.

When a monitoring parameter requiring the category change is present, the abnormality detection unit FDU changes the learned model MDL (including a threshold) of the monitoring parameter (step S204). In contrast, the abnormality detection unit FDU proceeds to the processing of step S205 when a monitoring parameter requiring the category change is not present.

For example, the case where the recipe ID is changed from "B2" to "B1" when the monitoring parameter is an EPD is assumed. In this case, the abnormality detection unit FDU searches the database DB2 (see FIG. 9) of the management apparatus CS through the communication network NW using the type "EPD" of the monitoring parameter and the recipe ID "B1" after the change as searching keys, for example, and loads the learned model MDL[1] and the threshold TH2a as searching results into the internal memory circuit IMEM in FIG. 2.

Further, the case where the process ID is changed from "H2" to "H1" when the monitoring parameter is an RF power is assumed. In this case, the abnormality detection unit FDU searches the database DB2 (see FIG. 9) through the communication network NW using the type "RF power" of the monitoring parameter and the recipe ID "H1" after the change as searching keys, for example, and loads the learned model MDL[k] and the threshold TH1a as searching results into the internal memory circuit IMEM in FIG. 2.

Note that the abnormality detection device FDD in FIG. 2, for example, may duplicate the learned model MDL having possibility of using in the device itself from the database DB2 into the external memory device OMEM in advance. Alternatively, the abnormality detection device FDD in FIG. 2 may use an external memory device OMEM as a virtual memory of the internal memory circuit IMEM and manage the learned model MDL stored in the external memory device OMEM by the least recently used method (LRU method) or the like.

In the case of using such a method, the abnormality detection unit FDU may search the external memory device OMEM and load the learned model MDL and the threshold TH as search results into the internal memory circuit IMEM. Accordingly, the congestion of the communication network NW involved with the acquisition of the learned model MDL can be suppressed, particularly in the case of a small number of products having many product types (that is, when the possibility of frequent changes of the learned models is high).

Then, in step S205, the abnormality detection unit FDU detects the start of treatment by the manufacturing device ME of the monitoring target. To be specific, taking FIG. 3 and FIG. 4 as examples, the abnormality detection unit FDU detects the start of treatment by detecting rising of the input waveform IW or receiving a trigger signal from the manufacturing device ME and controls the switch SW to be turned on. Next, the abnormality detection unit FDU uses the corresponding learned model MDL for each monitoring parameter, and for example, determines whether an abnormality of the sensor signal is present by using the methods illustrated in FIG. 3 and FIG. 4 (steps S206 and S207).

When an abnormality is present in the sensor signal, the abnormality detection unit FDU controls the switch SW in FIG. 3 to be turned off and sends the abnormality notification FS to the management apparatus CS through the communication network NW (step S208). Also in this case, the abnormality detection unit FDU may send the digital data group DTG in which the abnormality is present to the management apparatus CS with the abnormality notification FS. The management apparatus CS receives the abnormality notification FS and performs error handling processing such as temporary suspension of the process-start of the corresponding manufacturing device ME.

In contrast, when no abnormality is present in the sensor signal, the abnormality detection unit FDU controls the switch SW in FIG. 3 to be turned off and executes a predetermined data processing (step S209). Here, if the abnormality detection unit FDU sends, for example, all of the digital data groups DTG in which no abnormality is present, to the management apparatus CS, congestion of the normal network NW may be caused. Accordingly, the abnormality detection unit FDU sends a part of digital data groups in which no abnormality is present (for example, one in ten) to the management apparatus CS and in addition, may calculate statistic values or the like of the ten groups to send these values to the management apparatus CS. The management apparatus CS can update the learned model MDL by using a part of the digital data groups DTG, for example, and can manage the part of the digital data groups DTG comprehensively by the statistical values.

Meanwhile, regarding data represented by a waveform, raw data itself may be indispensable. Accordingly, the abnormality detection unit FDU temporarily stores the raw data in a memory (for example, the external memory device OMEM) and in the case of detecting no abnormality, may transfer the raw data in the memory to the management apparatus CS by batch processing at a constant period. Further, the abnormality detection unit FDU can immediately transfer the raw data using this data path in the case of detecting an abnormality.

Typical Effect of First Embodiment

As described above, by using the production system of the first embodiment, typically, it becomes possible to detect an abnormality in the production system without congestion of the communication network NW. In this case, in particular, the learned model MDL by artificial intelligence (AI) is used, so that an abnormality can be detected based on the characteristic shape of the analog waveform. Further, the production system generates a plurality of learned models MDL by learning after classifying contained data by a suitable classification method for each monitoring parameter and detects an abnormality of a monitoring parameter while selecting any one of the plurality of learned models appropriately based on the classification method. Thus, the quality of the learned model MDL is enhanced, and misinformation and false alarms can be reduced, so that an abnormality can be detected with high accuracy, for example. As a result, the production efficiency can be enhanced.

Note that the determination method of an abnormality through use of a learned model is not particularly limited to the method illustrated in FIGS. 3 and 4, and various methods can be used. For example, a learned model capable of directly distinguishing whether the abnormality is present is generated by learning many digital data groups of conforming products and digital data groups of defective products, and whether the abnormality is present may be determined by using this model. The learned model outputs whether the abnormality is present using a digital data group as input.

Second Embodiment

Schematic Configuration of Production System (Modification Example)

Figure 12:
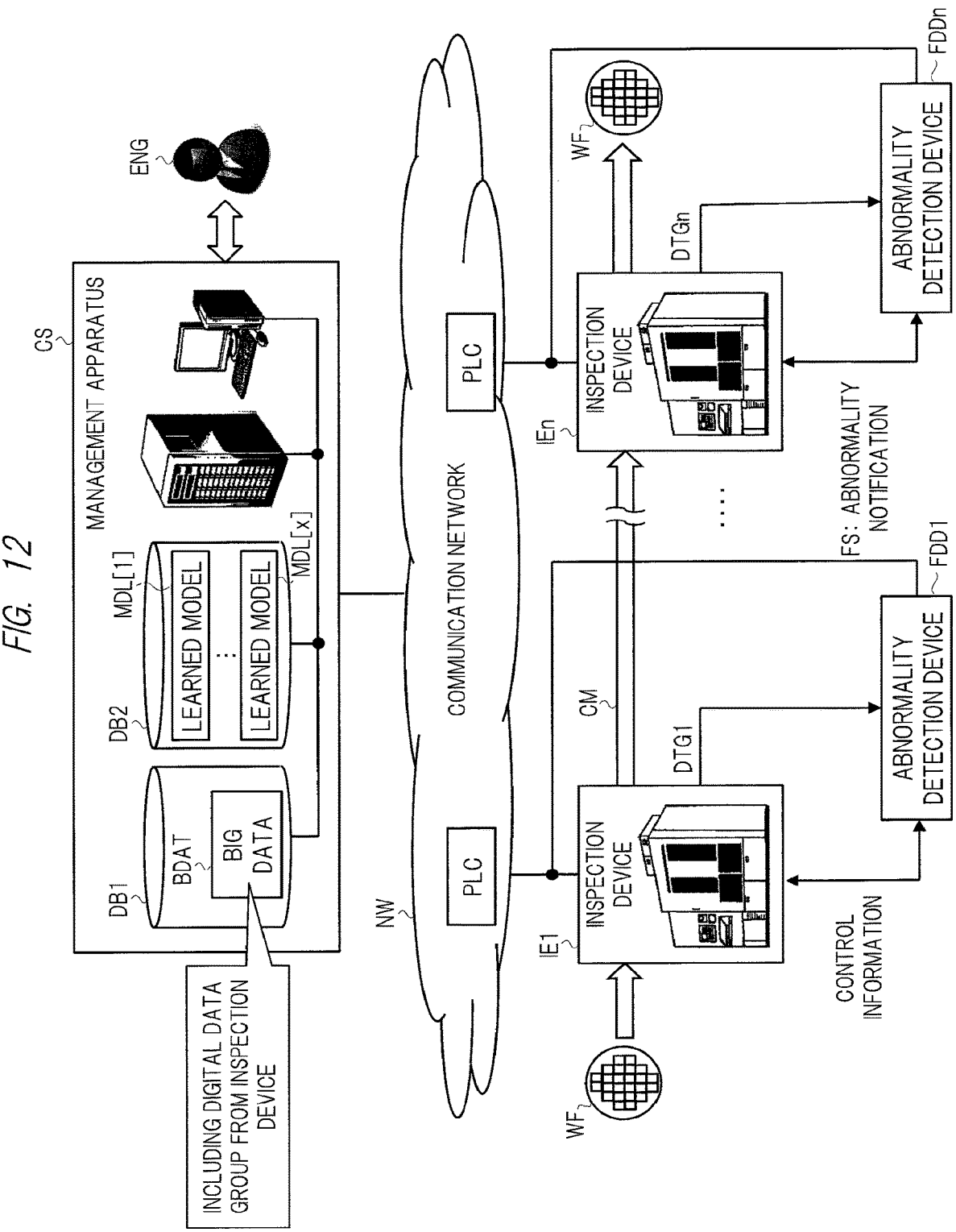
FIG. 12 is a schematic diagram illustrating a configuration example of a main part of a production system according to a second embodiment of the present invention.

FIG. 12 is a schematic diagram illustrating a configuration example of a main part of a production system according to a second embodiment of the present invention. The production system illustrated in FIG. 12 is different from the configuration example in FIG. 1 in that the manufacturing devices ME1 to MEn are replaced with inspection devices (edge devices) IE1 to IEn, respectively. The production system inspects a product through use of a plurality of inspection processes. The inspection devices IE1 to IEn perform measurement associated with a plurality of inspection processes and generate measurement data. In other words, although FIG. 1 illustrates a configuration in which measurement data is obtained from the manufacturing device ME through the sensor SEN, FIG. 12 illustrates a configuration in which the inspection device itself corresponds to a sensor and measurement data can be obtained directly from the inspection device.

The inspection devices IE1 to IEn are not particularly limited, but a device for measuring a surface state by irradiating a product of the measuring target (here, semiconductor wafer WF) with an electron beam or a laser beam, etc. is applicable. In such a device, there is a case where an analog waveform reflecting, for example, irregularities of the surface or the like is obtained as measurement data. Thus, in the example in FIG. 12, the inspection devices IE1 to IEn output the digital data groups DTG1 to DTGn forming analog waveforms as described before as measurement data. Each of the abnormality detection devices FDD1 to FDDn detects an abnormality in measurement data from the corresponding inspection device using the learned model MDL in the same manner as the first embodiment.

As described above, the same effect is obtained as the first embodiment also by using production system of the present second embodiment. Note that the abnormality detection devices FDD1 to FDDn can also be loaded in the corresponding inspection devices IE1 to IEn, respectively, similarly to the case in the first embodiment. Further, the inspection devices IE1 to IEn can be arranged appropriately between each of the manufacturing devices ME1 to MEn in FIG. 1. That is, a production system in which manufacturing devices and inspection devices are appropriately used in combination can also be built.

In the foregoing, the invention made by the inventors of the present invention has been concretely described based on the embodiments. However, the present invention is not limited to the foregoing embodiments, and various modifications and alterations can be made within the scope of the present invention. For example, the embodiments are described in detail to simplify the explanation of the present invention. Thus, it is not always necessary to provide all the described configurations. Moreover, the configurations of one of the embodiments may be partially replaced with those of the other embodiment or the configurations of one of the embodiments may further include the configurations of the other embodiment. Alternatively, the configurations of the embodiments may partially allow the addition of other configurations, deletion, and replacement.

For example, here, although classification has been carried out by setting classes as illustrated in FIGS. 6A and 6B, taking a production system of semiconductor products as an example, similar classification may be beneficial even in a case in which the present invention is applied to a production system for other products. To be specific, the classification is beneficial in the production system dealing with a plurality of products or a plurality of processes in one device. Among these particularly, the classification is more beneficial for a production system of semiconductor products since the system may deal with a small number of semiconductor products having many product types.

What is claimed is:

1. A production system for manufacturing a product, the production system comprising:
    a manufacturing device performing treatment associated with manufacturing processes;
    a master device managing the entire production system;
    a sensor corresponding to the manufacturing device and monitoring a treatment status of the manufacturing device;
    an abnormality detection device corresponding to the manufacturing device and detecting an abnormality of a sensor signal that is a monitoring result of the sensor; and
    a communication network connecting the manufacturing device, the master device, and the abnormality detection device,
    wherein the master device learns characteristics of a plurality of the sensor signals accumulated in past times through use of artificial intelligence to generate a learned model for determining whether an abnormality is present in the sensor signal, and
    wherein the abnormality detection device holds the generated learned model and determines whether an abnormality is present in the sensor signal, which is a current processing target, by using the held learned model.

2. The production system according to claim 1,
    wherein the master device classifies the plurality of sensor signals into a plurality of categories and learns to generate a plurality of the learned models corresponding to the plurality of categories, respectively, and
    wherein the abnormality detection device recognizes a category of the sensor signal, which is the current processing target, and determines whether an abnormality is present by using the learned model corresponding to the recognized category.

3. The production system according to claim 2,
    wherein the master device determines a classification method of the plurality of categories based on user instruction, and registers the determined classification method in the abnormality detection device, and
    wherein the abnormality detection device recognizes the category of the sensor signal, which is the current processing target, based on the registered classification method.

4. The production system according to claim 1,
    wherein the manufacturing processes are preceding processes of a semiconductor product.

5. The production system according to claim 1, wherein the abnormality detection device includes:
    a memory circuit that holds the learned model, and
    a processor circuit that determines whether an abnormality is present by using the held learned model.

6. The production system according to claim 5,
    wherein the processor circuit includes:
        an error detector that outputs an error value,
        an integrator that outputs an integrated value, and
        a comparator that determines the presence or absence of abnormality,
    wherein the error detector outputs the error value by sequentially calculating error between the learned model and the sensor signal,
    wherein the integrator outputs the integrated value by integrating the error value, and
    wherein the comparator determines presence of an abnormality when the integrated value exceeds a predetermined threshold.

7. The production system according to claim 6,
    wherein the error value is calculated by multiplying the error by a weighting factor in accordance with each area of the learned model.

* * * * *